(12) United States Patent
Tateishi et al.

(10) Patent No.: US 11,310,593 B2
(45) Date of Patent: Apr. 19, 2022

(54) VOICE INPUT DEVICE AND METHOD FOR ESTIMATION OF UTTERANCE DIRECTION

(71) Applicant: SONY CORPORATION, Tokyo (JP)

(72) Inventors: Kazuya Tateishi, Tokyo (JP); Shusuke Takahashi, Chiba (JP); Akira Takahashi, Saitama (JP); Kazuki Ochiai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 69 days.

(21) Appl. No.: 16/753,236

(22) PCT Filed: Sep. 27, 2018

(86) PCT No.: PCT/JP2018/035842
§ 371 (c)(1),
(2) Date: Apr. 2, 2020

(87) PCT Pub. No.: WO2019/073803
PCT Pub. Date: Apr. 18, 2019

(65) Prior Publication Data
US 2020/0329308 A1    Oct. 15, 2020

(30) Foreign Application Priority Data
Oct. 11, 2017    (JP) .............................. JP2017-197869

(51) Int. Cl.
*H04R 1/40*        (2006.01)
*G10L 15/22*       (2006.01)

(52) U.S. Cl.
CPC .............. *H04R 1/406* (2013.01); *G10L 15/22* (2013.01)

(58) Field of Classification Search
CPC ....... G10L 15/22; G10L 15/063; G10L 15/25; G10L 25/78; G10L 2015/0635;
(Continued)

(56) References Cited

U.S. PATENT DOCUMENTS 9,311,527 B1 *    4/2016   Yin ............................ G06T 7/73
9,621,984 B1 *    4/2017   Chu ......................... G06F 3/165
(Continued)

FOREIGN PATENT DOCUMENTS

CN    101398475 A    4/2009
CN    107199572 A    9/2017
(Continued)

OTHER PUBLICATIONS

Extended European Search Report of EP Application No. 18866426.2, dated Oct. 28, 2020, 07 pages.
(Continued)

*Primary Examiner* — Mohammad K Islam
(74) *Attorney, Agent, or Firm* — Chip Law Group

(57) ABSTRACT

The present technology relates to a voice input device and method that facilitate estimation of an utterance direction. The voice input device includes a fixed part disposed at a predetermined position, a movable part movable with respect to the fixed part, a microphone array attached to the fixed part, an utterance direction estimation unit that estimates an utterance direction on the basis of a voice from an utterer that is input from the microphone array, and a driving unit that drive the movable part according to the estimated utterance direction. The voice input device can be used by installation in, for example, a smart speaker, a voice agent, a robot, and the like.

7 Claims, 11 Drawing Sheets

(58) Field of Classification Search
CPC .. G05D 3/20; G06K 9/00248; G06K 9/00281; H04R 1/406; H04R 3/005
See application file for complete search history.

(56) References Cited

U.S. PATENT DOCUMENTS

| | | | |
|---|---|---|---|
| 10,242,666 B2* | 3/2019 | Monceaux | G10L 15/22 |
| 2007/0192910 A1* | 8/2007 | Vu | B25J 19/06 |
| | | | 700/245 |
| 2009/0086993 A1 | 4/2009 | Kawaguchi et al. | |
| 2010/0034397 A1* | 2/2010 | Nakadai | H04R 1/406 |
| | | | 381/58 |
| 2011/0050900 A1 | 3/2011 | Sato | |
| 2015/0281833 A1* | 10/2015 | Shigenaga | H04R 3/005 |
| | | | 381/92 |
| 2017/0206900 A1 | 7/2017 | Yo et al. | |
| 2018/0374494 A1* | 12/2018 | Yamaya | G06K 9/00523 |
| 2019/0025400 A1* | 1/2019 | Venalainen | H04R 3/005 |
| 2019/0206400 A1* | 7/2019 | Cui | G05D 1/0231 |
| 2020/0225344 A1* | 7/2020 | Yoon | G01H 3/125 |

FOREIGN PATENT DOCUMENTS

| | | |
|---|---|---|
| EP | 1715717 A1 | 10/2006 |
| JP | 01-056428 A | 3/1989 |
| JP | 2001-337694 A | 12/2001 |
| JP | 2007-221300 A | 8/2007 |
| JP | 2009-086055 A | 4/2009 |
| JP | 2011-053828 A | 3/2011 |
| JP | 5253278 B2 | 7/2013 |
| WO | 2013/015461 A1 | 1/2013 |

OTHER PUBLICATIONS

International Search Report and Written Opinion of PCT Application No. PCT/JP2018/035842, dated Nov. 27, 2018, 08 pages of ISRWO.

Office Action for Patent Application No. 18866426.2, dated Nov. 17, 2021, 05 pages.

* cited by examiner

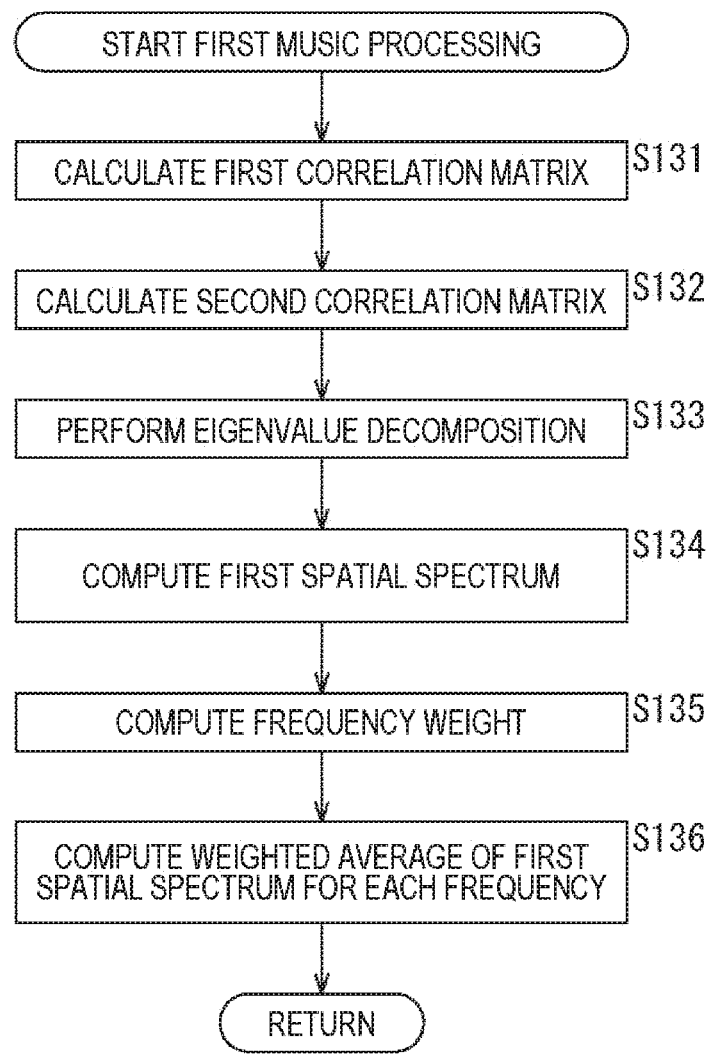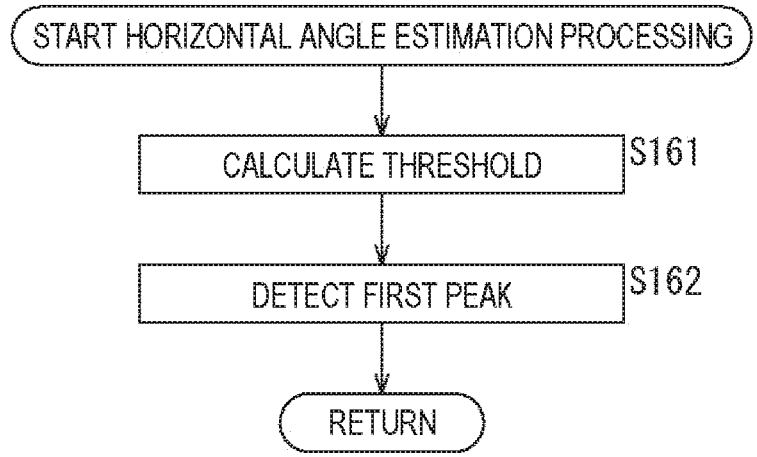

VOICE INPUT DEVICE AND METHOD FOR ESTIMATION OF UTTERANCE DIRECTION

CROSS REFERENCE TO RELATED APPLICATIONS

This application is a U.S. National Phase of International Patent Application No. PCT/JP2018/035842 filed on Sep. 27, 2018, which claims priority benefit of Japanese Patent Application No. JP 2017-197869 filed in the Japan Patent Office on Oct. 11, 2017. Each of the above-referenced applications is hereby incorporated herein by reference in its entirety.

TECHNICAL FIELD

The present technology relates to a voice input device and method, and a program, and in particular, to a voice input device and method, and a program that facilitate estimation of an utterance direction

BACKGROUND ART

In recent years, with the development of robot technology and artificial intelligence (AI), devices that can talk with a person or move their own bodies have increased. In order to recognize human voice, it is necessary to assume various use environments and to be able to suppress noise as much as possible. Therefore, it is known that noise is suppressed by sound collection with a microphone array in which a plurality of microphones is arranged and signal processing using spatial information.

For example, in a case where a humanoid robot is used, a plurality of microphones can be arranged on the head. With this arrangement, there is a high possibility that positions of the user's mouth and the microphones are close to each other, and the voice can be easily recognized. Furthermore, it is expected that the distance between the microphones and the driving sound source such as a motor becomes longer, the noise is reduced, and the signal-to-noise ratio (SNR) of the target voice is improved.

It is known that accurate voice recognition can be performed by estimating the direction of a speaker by using a correlation matrix obtained by performing an operation on signals collected by the microphone array and emphasizing the voice in the estimated direction (for example, Patent Document

CITATION LIST

Patent Document

Patent Document 1: Japanese Patent Application Laid-Open No. 2001-337694

SUMMARY OF THE INVENTION

Problems to be Solved by the Invention

However, if the utterance direction is estimated and then the device turns to the utterance direction, the positional relationship between information about the noise direction in space, which has been learned so far, and the microphone array after the device is moved is broken. Therefore, noise learning information that has been learned sequentially cannot be used, and it is necessary to learn noise information spatially again after the movement.

However, immediately after the device turns to the utterance direction, utterance of the next user may be performed. In this case, there is a possibility that sufficient learning time cannot be secured, and as a result, noise suppression performance may deteriorate and voice recognition may fail.

The present technology has been made in view of such a situation, and makes it possible to facilitate estimation of the utterance direction

Solutions to Problems

One aspect of the present technology is a voice input device including: a fixed part disposed at a predetermined position; a movable part movable with respect to the fixed part; a microphone array attached to the fixed part; an utterance direction estimation unit configured to estimate an utterance direction on the basis of a voice from an utterer, the voice being input from the microphone array; and a driving unit configured to drive the movable part according to the estimated utterance direction.

A control unit configured to recognize the voice from the utterer, the voice being input from the microphone array, and to control a front driving unit on the basis of a result of the recognition may further be provided.

The control unit may include an internal or external voice recognition engine that recognizes the voice from the utterer.

In the microphone array, a plurality of microphones may be arranged in a plane.

The movable part may be symmetric with respect to a rotation center.

The utterance direction estimation unit may include: a first estimation unit configured to estimate a first horizontal angle that is a horizontal angle in the utterance direction from a signal of the voice from the utterer; and a second estimation unit configured to estimate a second horizontal angle that is the horizontal angle in the utterance direction and an elevation angle, with respect to the first horizontal angle, in a predetermined range near the first horizontal angle.

One aspect of the present technology is a voice input method of a voice input device including: a fixed part disposed at a predetermined position; a movable part movable with respect to the fixed part; and a microphone array attached to the fixed part, the voice input method including: a step of estimating an utterance direction on the basis of a voice from an utterer, the voice being input from the microphone array attached to the fixed part; and a step of driving the movable part according to the estimated utterance direction.

One aspect of the present technology is a program for causing a computer to execute voice input processing of a voice input device including: a fixed part disposed at a predetermined position; a movable part movable with respect to the fixed part; and a microphone array attached to the fixed part, the voice input processing including: a step of estimating an utterance direction on the basis of a voice from an utterer, the voice being input from the microphone array attached to the fixed part; and a step of driving the movable part according to the estimated utterance direction.

According to one aspect of the present technology, a fixed part is disposed at a predetermined position, a movable part is movable with respect to the fixed part, a microphone array is attached to the fixed part, an utterance direction estimation unit estimates an utterance direction on the basis of a voice from an utterer that is input from the microphone array, and a driving unit drives the movable part according to the estimated utterance direction.

Effects of the Invention

As described above, one aspect of the present technology makes it possible to facilitate estimation of the utterance direction. Note that advantageous effects described here are not necessarily restrictive, and any of the effects described in the present specification may be applied.

BRIEF DESCRIPTION OF DRAWINGS

FIG. 8 is a flowchart illustrating first MUSIC processing.
FIG. 9 is a flowchart illustrating horizontal angle estimation processing.

MODE FOR CARRYING OUT THE INVENTION

Embodiments for carrying out the present technology will be described below. Note that the description will be made in the following order.

Figure 2:
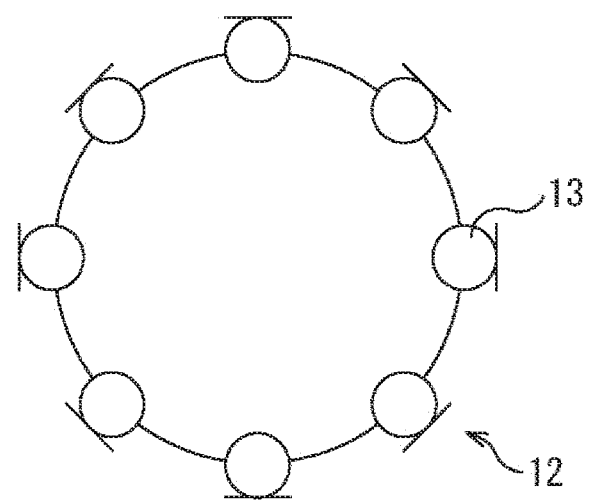
FIG. 2 is a diagram showing a configuration of a microphone array.
Figure 3:
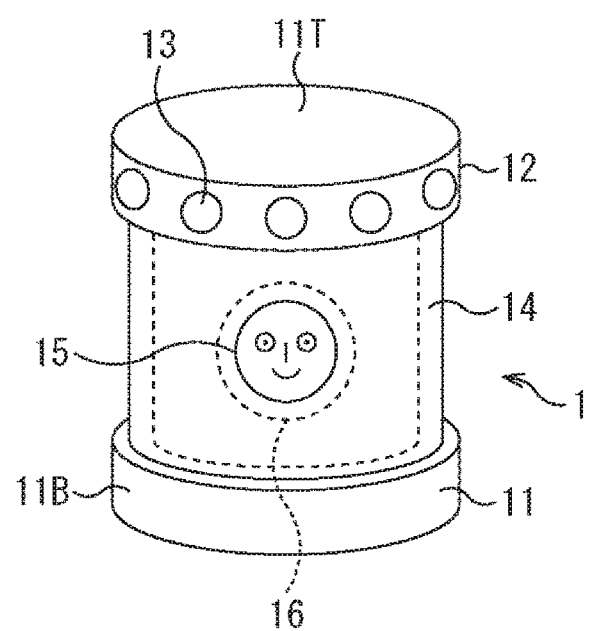
FIG. 3 is a perspective view showing the physical configuration of one embodiment of the voice input device.

1. Physical configuration of voice input device (FIGS. 1 to 3)
2. Electric configuration of voice input device (FIGS. 4 and 5)
3. Operation of voice input device (FIGS. 6 to 11)
4. Characteristics of spatial spectrum (FIGS. 12 to 14)
5. Computer (FIG. 15)
6. Other <Physical Configuration of Voice Input Device>(FIGS. 1 to 3)

First, the physical configuration of the voice input device will be described with reference to FIGS. 1 to 3. FIG. 1 is a perspective view showing the physical configuration of one embodiment of the voice input device. FIG. 2 is a diagram showing the configuration of a microphone array.

Figure 1:
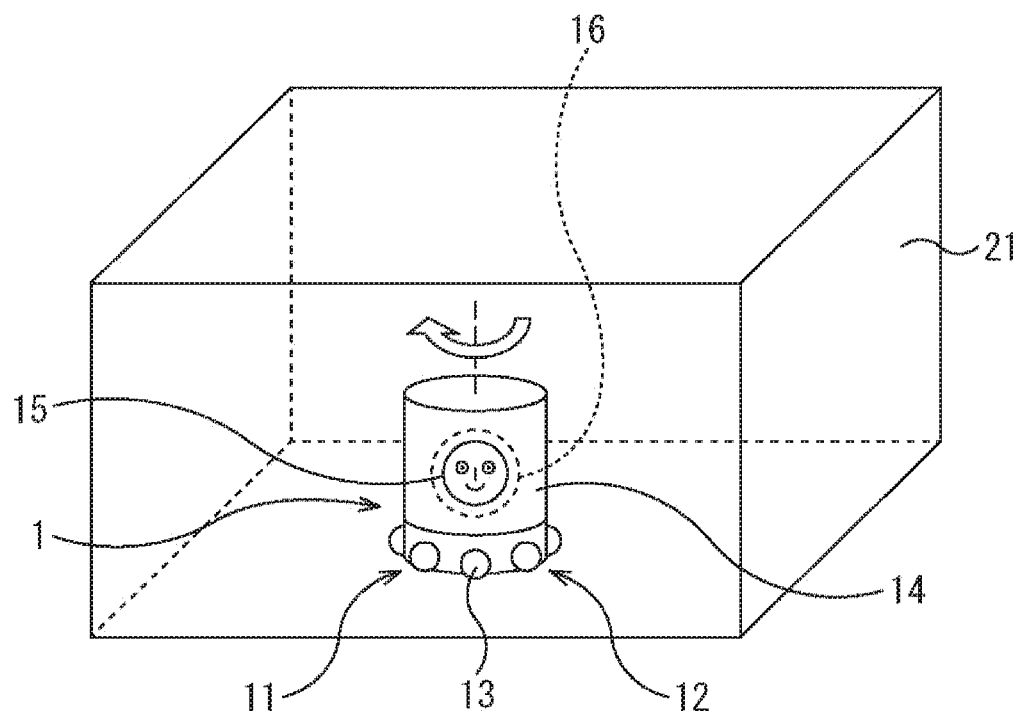
FIG. 1 is a perspective view showing a physical configuration of one embodiment of a voice input device.

As shown in FIG. 1, the voice input device 1 of this embodiment includes a substantially cylindrical housing 11, and a microphone array 12 is provided below an outer peripheral side surface thereof. As shown in FIG. 2, the microphone array 12 includes a plurality of (eight in the example of FIG. 2) microphones 13 arranged in a substantially horizontal annular shape and directed from the center to the outer periphery along the radius. Note that the plurality of microphones 13 of the microphone array 12 can be arranged linearly or three-dimensionally.

Above the housing 11, a movable part 14 that is movable with respect to the housing 11 is formed. The movable part 14 is driven by a built-in servomotor 53 that serves as a driving unit (as described later with reference to FIG. 4), and is movable (rotatable in this example) in a horizontal plane. That is, the housing 11 disposed at a predetermined position so as to be in contact with a table or a floor does not rotate, but forms a so-called fixed part. The microphone array 12, which is provided in the housing 11, does not rotate even if the movable part 14 rotates.

Note that by using sensor information of a geomagnetic sensor, a gyro sensor, and the like, even if the movable part 14 moves, the housing 11 including the microphone array 12 can be kept at the original position.

The movable part 14 is also formed in a substantially cylindrical shape, and a display unit 15 is provided on a front surface of the movable part 14. In this example, a picture of a face is displayed on the display unit 15, which indicates that the surface is the front surface. The movable part 14 is rotated such that, for example, the display unit 15 is directed in the utterance direction. In the movable part 14, a speaker 16 is housed on a back side of the display unit 15. The speaker 16 outputs a sound such as a message to the user.

The voice input device 1 is disposed in a space 21 such as in a room, for example.

FIG. 3 is a perspective view showing the physical configuration of one embodiment of the voice input device. The voice input device 1 can also be configured as shown in FIG. 3. In the voice input device 1 of FIG. 3, a lower end 11B and an upper end 11T of the substantially cylindrical housing 11 have a large diameter and protrude outward. A portion therebetween has a small diameter and is recessed inward. Then, the movable part 14 is rotatably disposed in the recessed portion. In this example, the microphone array 12 is provided in the upper end 11T of the housing 11. Therefore, even if the movable part 14 rotates, the microphone array 12 does not rotate. The display unit 15 is formed on the movable part 14, and the speaker 16 is disposed on the back side.

The voice input device 1 is installed in, for example, a smart speaker, a voice agent, a robot, and the like, and has a function of, in a case where a voice is uttered from a surrounding sound source (for example, a person), estimating an utterance direction in which the voice is uttered. The estimated direction is used to direct the front surface of the device in the utterance direction.

Figure 4:
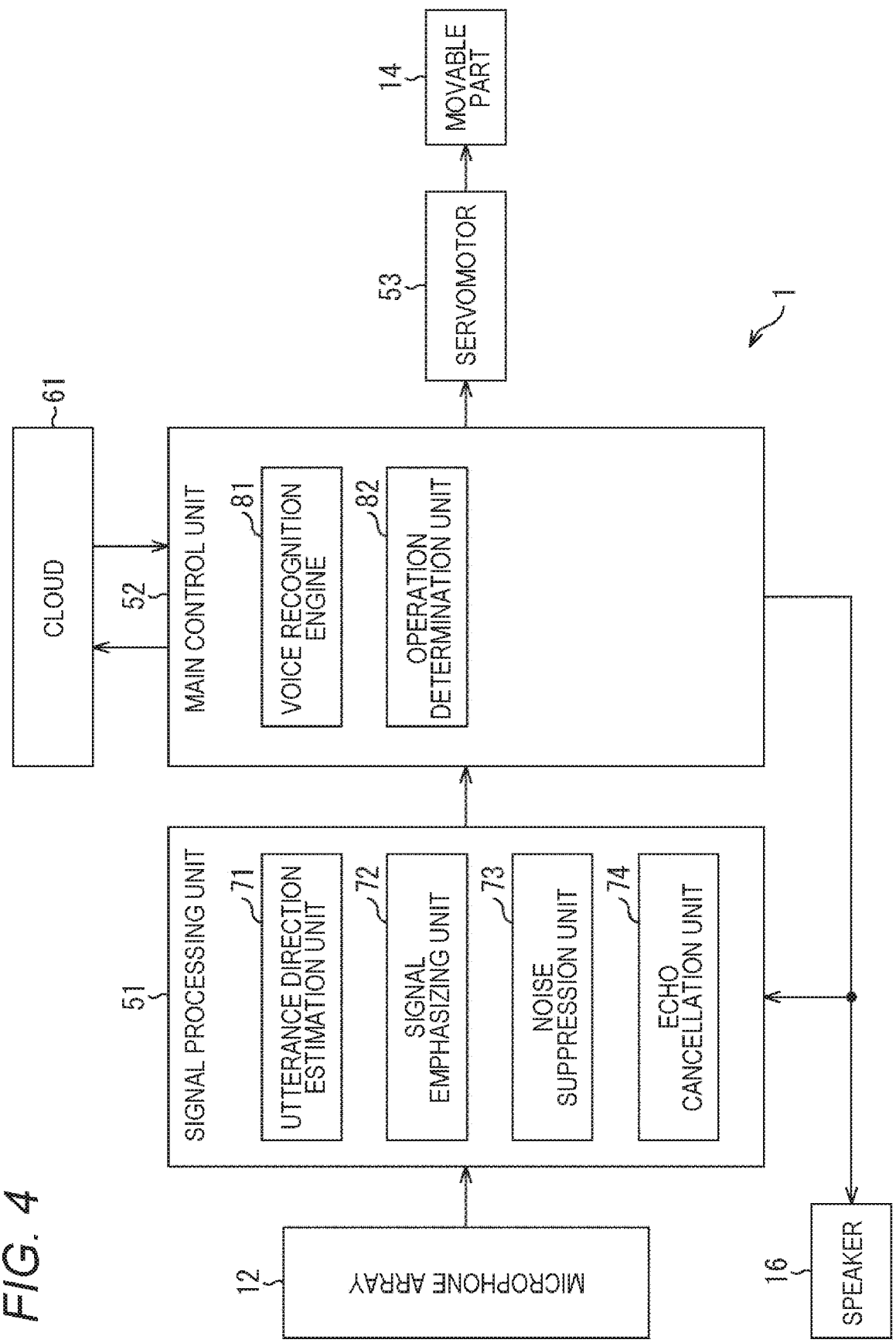
FIG. 4 is a block diagram showing an electric configuration of the voice input device.
Figure 5:
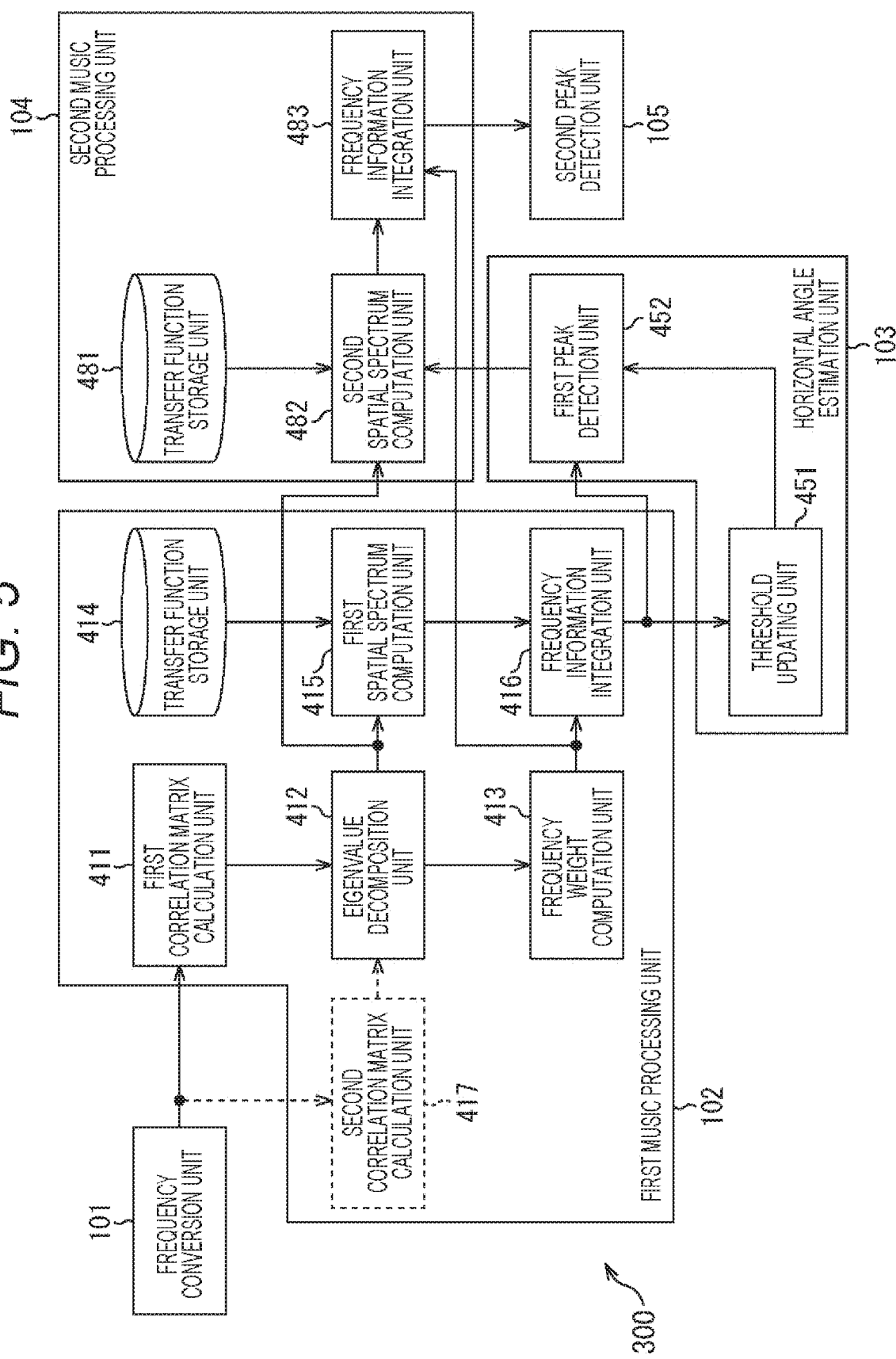
FIG. 5 is a block diagram showing a configuration of an utterance direction estimation unit.

<Electric Configuration of Voice Input Device>(FIGS. 4 and 5)

Next, with reference to FIG. 4, the electric configuration of the voice input device will be described. FIG. 4 is a block diagram showing the electric configuration of the voice input device.

The voice input device 1 of FIG. 4 includes the microphone array 12, a signal processing unit 51, a main control unit 52, the servomotor 53, the movable part 14, and the speaker 16.

The signal processing unit 51 that processes a signal from the microphone array 12 includes an utterance direction estimation unit 71, a signal emphasizing unit 72, a noise suppression unit 73, and an echo cancellation unit 74. The utterance direction estimation unit 71 estimates the utterance direction on the basis of the signal from the microphone array 12. The signal emphasizing unit 72 emphasizes a target sound signal. The noise suppression unit 73 suppresses a noise component included in the target sound signal. The echo cancellation unit 74 performs processing of canceling an echo component included in the signal input from the microphone array 12.

The main control unit 52 includes a voice recognition engine 81 and an operation determination unit 82. The voice recognition engine 81 recognizes a voice from an input signal. The operation determination unit 82 determines an operation to execute on the basis of content included in the recognized voice.

Note that in a case where the main control unit 52 is connected to a cloud 61 via the Internet and the like and a voice recognition engine exists there, in place of the internal voice recognition engine 81, voice recognition processing can be performed using the external voice recognition engine.

In a case where the operation determination unit 82 instructs the servomotor 53 to drive the movable part 14, the servo motor 53 drives the movable part 14 in response to the instruction. In the example shown in FIG. 1 or 3, for example, the movable part 14 is rotated to a predetermined position.

Next, the configuration of the utterance direction estimation unit 71 will be described with reference to FIG. 5. FIG. 5 is a block diagram showing the configuration of the utterance direction estimation unit.

The utterance direction estimation unit 71 of FIG. 5 includes a frequency conversion unit 101, a first MUSIC processing unit 102, a horizontal angle estimation unit 103, a second MUSIC processing unit 104, and a second peak detection unit 105.

The frequency conversion unit 101 performs frequency conversion on an acoustic signal input from the microphone array 12. The first MUSIC processing unit 102 that serves as a first estimation unit determines an eigenvalue and an eigenvector of a correlation matrix of the signal of respective frequencies on the basis of a frequency domain signal input from the frequency conversion unit 101. Moreover, the first MUSIC processing unit 102 performs an operation on a spatial spectrum at the entire horizontal angle in a state where the elevation angle with respect to the utterance direction viewed from the microphone array 12 is fixed at a predetermined constant value.

The horizontal angle estimation unit 103 calculates a threshold from the spatial spectrum on which an operation is performed by the first MUSIC processing unit 102. Furthermore, the horizontal angle estimation unit 103 detects the spatial spectrum having a peak value exceeding the threshold, and estimates and detects the direction corresponding to the spatial spectrum as the utterance direction (first horizontal angle $\hat{\theta}$).

The eigenvector of the correlation matrix of the signal of respective frequencies obtained by the first MUSIC processing unit 102 is supplied to the second MUSIC processing unit 104 that serves as the second estimation unit. With respect to the first horizontal angle $\hat{\theta}$ estimated by the horizontal angle estimation unit 103, the second MUSIC processing unit 104 computes the spatial spectrum at the horizontal angle in a limited predetermined range near the first horizontal angle $\hat{\theta}$ and the entire elevation angle on the basis of the eigenvector.

The second peak detection unit 105 detects the peak value of the spatial spectrum for the horizontal angle and the elevation angle within the predetermined range computed by the second MUSIC processing unit 104, and estimates the direction corresponding to the peak value as the final utterance direction ($\theta^{out}$, $\varphi_{out}$).

The first MUSIC processing unit 102 includes a first correlation matrix calculation unit 411, an eigenvalue decomposition unit 412, a frequency weight computation unit 413, a transfer function storage unit 414, and a first spatial spectrum computation unit 415. Moreover, the first MUSIC processing unit 102 includes a frequency information integration unit 416 and a second correlation matrix calculation unit 417. However, this configuration is used in a case where GEVD-MUSIC is used. In a case where SEVD-MUSIC is used, the second correlation matrix calculation unit 417 is omitted. GEVD means generalized eigenvalue decomposition, and SEVD means standard eigenvalue decomposition.

The first correlation matrix calculation unit 411 calculates a correlation matrix of a target signal of respective frequencies for every time frame. The second correlation matrix calculation unit 417 calculates a correlation matrix of a noise signal of respective frequencies for every time frame. The eigenvalue decomposition unit 412 performs an operation on an eigenvalue and an eigenvector of the correlation matrix. The frequency weight computation unit 413 computes a frequency weight representing the degree of contribution of a spatial spectrum for each frequency. In a case where a sound arrives from a certain direction, an imbalance is created in distribution of the eigenvalue, and only the eigenvalue of the number of sound sources becomes large.

The transfer function storage unit 414 stores a transfer function vector in advance. The first spatial spectrum computation unit 415 uses the eigenvector and the transfer function vector relating to the horizontal angle θ to compute a spatial spectrum indicating the degree of sound arrival from the direction of the horizontal angle θ. The frequency information integration unit 416 integrates the first spatial spectrum on the basis of the frequency weight.

The horizontal angle estimation unit 103 includes a threshold updating unit 451 and a first peak detection unit 452. The threshold updating unit 451 calculates a threshold for determining whether or not to employ a peak of the spatial spectrum as a detection result. The first peak detection unit 452 detects the direction of the spatial spectrum having a peak exceeding the threshold.

The second MUSIC processing unit 104 includes a transfer function storage unit 481, a second spatial spectrum computation unit 482, and a frequency information integration unit 483. The transfer function storage unit 481 stores the transfer function vector in advance. The second spatial spectrum computation unit 482 computes the spatial spectrum indicating the degree of sound arrival from the direction of the predetermined horizontal angle and the elevation angle. The frequency information integration unit 483 computes the weighted average of the spatial spectrum for each frequency.

<Operation of Voice Input Device>
(FIGS. 6 to 11)

Figure 6:
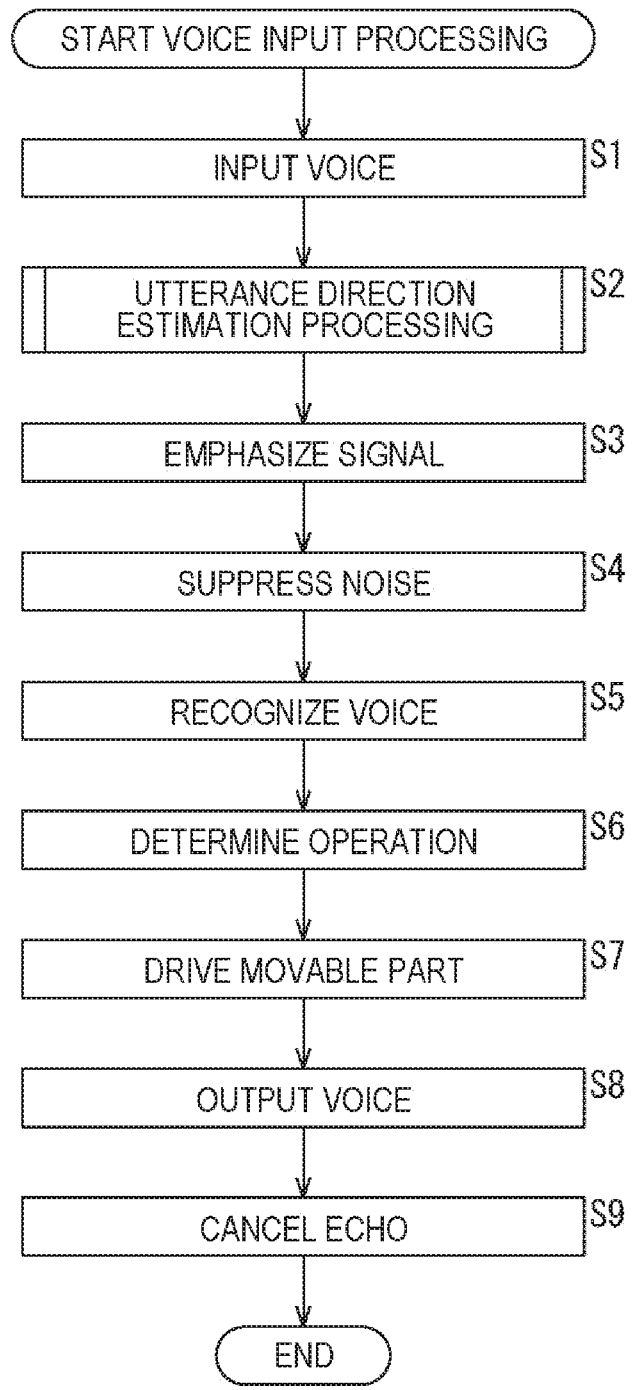
FIG. 6 is a flowchart illustrating voice input processing.

Next, the operation of the voice input device 1 will be described with reference to FIG. 6. FIG. 6 is a flowchart illustrating voice input processing. In step S1, the microphone array 12 inputs a voice. That is, the voice uttered by an utterer is input. In step S2, the utterance direction estimation unit 71 performs utterance direction estimation processing. Details thereof will be described later with reference to FIGS. 7 to 11. With this operation, the direction (horizontal angle and elevation angle) in which the voice of the utterer is uttered is estimated.

In step S3, the signal emphasizing unit 72 emphasizes a signal. That is, a voice component in the direction estimated as the utterance direction is emphasized. In step S4, the noise suppression unit 73 suppresses a noise component and improves SN.

In step S5, the voice recognition engine 81 (or external voice recognition engine existing in the cloud 61) performs processing of recognizing the voice from a voice signal supplied from the signal processing unit 51. The recognition result is converted into text as needed. In step S6, the operation determination unit 82 determines an operation. That is, the operation corresponding to content of the recognized voice is determined. Then, in step S7, the operation determination unit 82 controls the servomotor 53 to drive the movable part 14. Moreover, in step S8, the operation determination unit 82 supplies a signal to the speaker 16 and outputs the voice.

With this operation, for example, in a case where a greeting of "Hello" from the utterer is recognized, the movable part 14 is rotated in the direction of the utterer, and a greeting of "Hello, how are you?" is uttered from the speaker 16 toward the utterer.

In step S9, the echo cancellation unit 74 cancels an echo. That is, the voice output from the speaker 16 may be delayed by a predetermined time and collected by the microphone array 12 as an echo mixed with other sounds. The echo cancellation unit 74 uses the voice signal output from the speaker 16 as a reference signal to cancel the echo component from the signal collected by the microphone array 12.

In the voice input device 1, even if the movable part 14 rotates such that the front surface is directed to the utterer, the microphone array 12 does not rotate. Therefore, the transfer function of the microphone array 12 does not change before and after the rotation of the movable part 14. Therefore, the utterance direction can be quickly and correctly estimated without learning the transfer function again.

Figure 7:
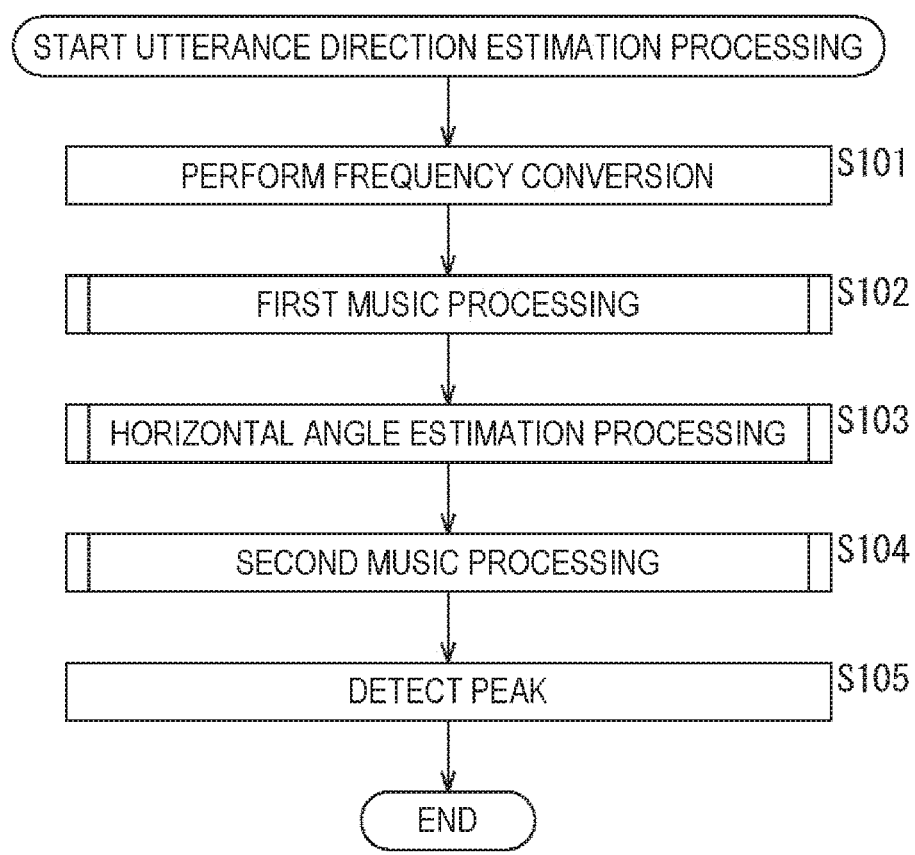
FIG. 7 is a flowchart illustrating utterance direction estimation processing.

Next, the utterance direction estimation processing will be described with reference to FIG. 7. FIG. 7 is a flowchart illustrating the utterance direction estimation processing.

In step S101, the frequency conversion unit 101 performs frequency conversion on an acoustic signal input from the microphone array 12. That is, the acoustic signal is converted from a signal of a time-base domain to a signal of a frequency domain. For example, processing of executing discrete Fourier transform (DFT) or short time Fourier transform (STFT) is performed for every frame. For example, a frame length can be 32 ms and a frame shift can be 10 ms.

In step S102, the first MUSIC processing unit 102 performs first MUSIC processing. Details of the first MUSIC processing will be described with reference to FIG. 8. FIG. 8 is a flowchart illustrating the first MUSIC processing.

In step S131 of FIG. 8, the first correlation matrix calculation unit 411 calculates a first correlation matrix. The first correlation matrix is a correlation matrix of a target sound signal of respective frequencies for every time frame, and each element thereof represents a correlation of each microphone 13. An operation is performed on the first correlation matrix on the basis of the following equation (1). In equation (1), $T_R$ represents a frame length for calculating the correlation matrix, and the vector $z_{\omega,\tau}$ represents a signal of a frequency $\omega$ in a time frame $\tau$. H represents Hermite transposition.

[Equation 1]

$$R_{\omega,t} = \frac{1}{T_R} \sum_{\tau=t-T_R}^{t} z_{\omega,\tau} z_{\omega,\tau}^H \qquad (1)$$

In step S132, the second correlation matrix calculation unit 417 calculates a second correlation matrix. The second correlation matrix is a correlation matrix of a noise signal of respective frequencies for every time frame, and is calculated on the basis of the following equation (2).

[Equation 2]

$$K_{\omega,t} = \frac{1}{T_K} \sum_{\tau=t-\Delta t-T_K}^{t-\Delta t} \alpha_{\omega,\tau} z_{\omega,\tau} z_{\omega,\tau}^H \qquad (2)$$

In equation (2), $T_K$ represents a frame length for calculating the correlation matrix, and $\Delta t$ is used such that the signal of the time frame common to $R_{\omega,t}$ of equation (1) and $K_{\omega,t}$ of equation (2) is not used. $\alpha_{\omega,\tau}$ is a weight and may be generally 1, but in a case where it is desired to change the weight depending on the type of sound source, it is possible to prevent all the weights from becoming zero as in equation (3).

$$K_{\omega,t} = (1-\alpha_{\omega,t})K_{\omega,t-1} + \alpha_{\omega,t} Z_{\omega, t-\Delta t} Z_{\omega, t-\Delta t}^H \qquad (3)$$

According to equation (3), the second correlation matrix calculation unit 417 sequentially updates a second spatial correlation matrix to which a weight has been applied, which is subjected to generalized eigenvalue decomposition by the eigenvalue decomposition unit 412 in the subsequent stage, on the basis of the second spatial correlation matrix to which a past weight has been applied. Such an updating equation makes it possible to use a stationary noise component for a long time. Moreover, in a case where the weight is a continuous value from 0 to 1, as the second space correlation matrix is calculated in more past, the number of times of weight integration increases and the weight becomes smaller, and thus larger weight is applied as the stationary noise component is generated at later time. Therefore, with the larger weight applied to the stationary noise component at the most recent time, which is considered to be close to the stationary noise component behind the target sound, the calculation of the second spatial correlation matrix becomes possible.

In step S133, the eigenvalue decomposition unit 412 performs eigenvalue decomposition. That is, the eigenvalue decomposition unit 412 performs generalized eigenvalue decomposition based on the weighted second spatial correlation matrix supplied from the second correlation matrix calculation unit 417, and a first spatial correlation matrix supplied from the first correlation matrix calculation unit 411. For example, the eigenvalue and the eigenvector are calculated from the following equation (4).

[Equation 4]

$$R_{\omega,t} e_{\omega,t,i} = \lambda_{\omega,t,i} K_{\omega,t} e_{\omega,t,i} \qquad (4)$$
$$(i = 1, \ldots, M)$$

In equation (4), $\lambda i$ represents the i-th largest eigenvalue vector determined by generalized eigenvalue decomposition, $e_i$ represents an eigenvector corresponding to $\lambda_i$, and M represents the number of microphones 13.

In a case where SEVD is used, $K_{\omega,t}$ is set as in equation (5).

[Equation 5]

$$K_{\omega,t}=I \quad (5)$$

In a case where GEVD is used, equation (4) is transformed as expressed by equations (7) and (8) by using a matrix $\phi_{\omega,t}$ satisfying the following equation (6). This will lead to a problem of SEVD, and the eigenvalue and the eigenvector are determined from equations (7) and (8).

[Equation 6]

$$\phi_{\omega,t}\phi_{\omega,t}=K_{\omega,t} \quad (6)$$

$$(\phi_{\omega,t}{}^{-H}R_{\omega,t}\phi_{\omega,t}{}^{-1})f_{\omega,t,i}=\lambda_{\omega,t,i}f_{\omega,t,i} \quad (7)$$

$$f_{\omega,t,i}=\phi_{\omega,t}e_{\omega,t,i} \quad (8)$$

$\phi^{-H}_{\omega,t}$ in equation (7) is a whitening matrix. A part in the parenthesis on the left side of equation (7) is obtained by whitening $R_{\omega,t}$ by the stationary noise component, that is, obtained by removing the stationary noise component.

In step S134, the first spatial spectrum computation unit 415 computes the first spatial spectrum $P''_{\omega,\theta,t}$ on the basis of the following equations (9) and (10). That is, the first spatial spectrum computation unit 415 computes the spatial spectrum $P''_{\omega,\theta,t}$ representing the degree of sound arrival from the direction θ by using the eigenvector $e_i$ corresponding to the M-N eigenvalues from the smallest one and a steering vector $a_\theta$. The eigenvector $e_i$ is supplied from the eigenvalue decomposition unit 412. The steering vector $a_{74}$, which is a transfer function regarding the direction θ, is a transfer function obtained in advance assuming that there is a sound source in the direction θ, and is stored in advance in the transfer function storage unit 414.

[Equation 7]

$$P^n_{\omega,\theta,t} = \frac{a^H_{\omega,\theta}\Phi^{-1}_{\omega,t}\Phi^{-H}_{\omega,t}a_{\omega,\theta}}{a^H_{\omega,\theta}\Phi^{-1}_{\omega,t}F^n_{\omega,t}F^{nH}_{\omega,t}\Phi^{-H}_{\omega,t}a_{\omega,\theta}} \quad (9)$$

$$F^n_{\omega,t} = [f_{\omega,t,N+1}, \ldots, f_{\omega,t,M}] \quad (10)$$

N represents the number of sound sources, and θ represents the horizontal direction for calculating the spatial spectrum while the elevation angle is fixed.

In step S135, the frequency weight computation unit 413 computes a frequency weight representing the degree of contribution of the spatial spectrum for each frequency. In a case where a sound is arriving from a certain direction, an imbalance is created in distribution of the eigenvalue, and only the eigenvalue of the number of sound sources becomes large. For example, the frequency weight $w_{\omega,t}$ is calculated by the following equation (11). $\lambda_i$ is the i-th largest eigenvalue obtained by generalized eigenvalue decomposition, and the eigenvalue of the numerator in equation (11) means the largest eigenvalue.

[Equation 8]

$$w_{\omega,t} = \frac{\lambda_{\omega,t,1}}{\sum_{m=1}^{M}\lambda_{\omega,t,m}} \quad (i=1,\ldots,M) \quad (11)$$

In step S136, the frequency information integration unit 416 computes the weighted average $P^{\sim n}_{\theta,t}$ of the first spatial spectrum for each frequency by the following equations (12) and (13). The first spatial spectrum $P''_{\omega,\theta,t}$ is supplied from the first spatial spectrum computation unit 415, and the frequency weight $w_{\omega,t}$ is supplied from the frequency weight computation unit 413.

[Equation 9]

$$\overline{P}^n_{\theta,t} = \frac{\sum_\omega w_{\omega,t}}{\sum_\omega \frac{w_{\omega,t}}{P^n_{\omega,\theta,t}}} \quad (12)$$

$$\hat{P}^n_{\theta,t} = \log \overline{P}^n_{\theta,t} - \min_{\theta'} \log \overline{P}^n_{\theta',t} \quad (13)$$

Note that the second term in equation (13) is to minimize log $P''_{\theta',t}$ in equation (13) when θ' is changed in the entire range of the horizontal direction θ in which the spatial spectrum is calculated with the elevation angle fixed.

Although the harmonic mean is determined in the operation of equation (12), the arithmetic mean or the geometric mean can be determined. By the operation of equation (13), the minimum value is normalized to 0. The log base in this operation is arbitrary, and for example, Napier's constant can be used. The operation by equation (13) produces an effect of suppressing the peak irrelevant to the sound source to a threshold or less in the first peak detection unit 452 in the subsequent stage.

As described above, the weighted average $P^{\sim n}_{\theta,t}$ of the first spatial spectrum is calculated by the first MUSIC processing of the first MUSIC processing unit 102.

Returning to FIG. 7, after the first MUSIC processing in step S102 (processing of FIG. 8), horizontal angle estimation processing is performed by the horizontal angle estimation unit 103 in step S103. The horizontal angle estimation processing will be described with reference to FIG. 9. FIG. 9 is a flowchart illustrating the horizontal angle estimation processing.

In step S161, the threshold updating unit 451 calculates the threshold. That is, out of the weighted average $P^{\sim n}_{\theta,t}$ of the first spatial spectrum output from the frequency information integration unit 416 of the first MUSIC processing unit 102, a threshold $P^{th}_{\theta,t}$ for determining whether or not to perform peak detection is calculated by, for example, the following equations (14) and (15). $\alpha^{th}$, $\beta^{th}$, and $\gamma^{th}$ are each constants, and Θ represents the number of scanning directions.

[Equation 10]

$$P^{th}_{\theta,t} = \beta^{th}D^{th}_{\theta,t} + \max\left[\gamma^{th}, \frac{1}{\Theta}\sum_{\theta'=1}^{\Theta}\hat{P}^n_{\theta',t}\right] \quad (14)$$

$$D^{th}_{\theta,t} = (1-\alpha^{th})D^{th}_{\theta,t-1} + \alpha^{th}\hat{P}^n_{\theta,t} \quad (15)$$

This threshold value $P^{th}_{\theta,t}$ produces an effect of removing a sound source that is not in that direction but has a small peak value, or removing a sound that continues to ring from a certain direction. The target voice is often a short command or utterance for manipulating a device, and is assumed not to last for a long time.

Next, in step S162, the first peak detection unit 452 detects a first peak. That is, out of the weighted average $P''^n_{\theta,t}$ of the first spatial spectrum output from the frequency information integration unit 416, those having a peak exceeding the threshold value $P'^{th}_{\theta,t}$ output from the threshold value updating unit 451 are detected. Then, the horizontal angle $\hat{\theta}$ corresponding to the weighted average $P''^n_{\theta,t}$ of the first spatial spectrum having the detected peak is output as the utterance direction (first horizontal angle) when the elevation angle is fixed.

As described above, the first horizontal angle $\hat{\theta}$, which is the utterance direction when the elevation angle is fixed, is estimated by the horizontal angle estimation processing of the horizontal angle estimation unit 103 in step S103 of FIG. 7 (processing of FIG. 9).

Figure 10:
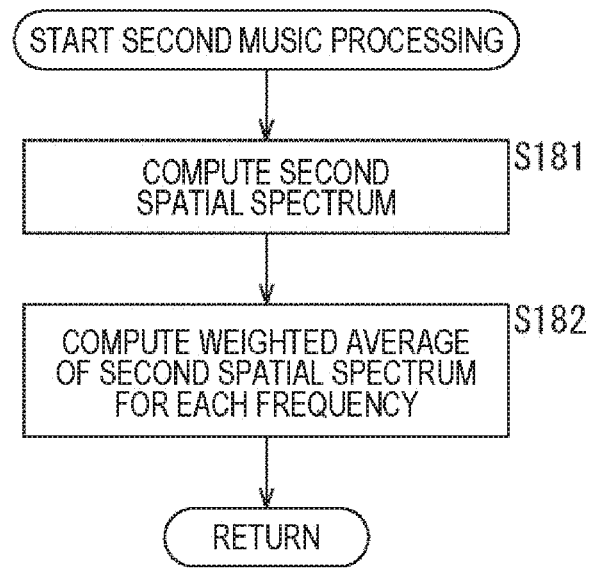
FIG. 10 is a flowchart illustrating second MUSIC processing.

Next to the horizontal angle estimation processing in step S103 of FIG. 7, the second MUSIC processing is performed by the second MUSIC processing unit 104 in step S104. Details of the second MUSIC processing will be described with reference to FIG. 10. FIG. 10 is a flowchart illustrating the second MUSIC processing.

In step S181, the second spatial spectrum computation unit 482 computes a second spatial spectrum. That is, the second spatial spectrum is computed by using the eigenvector $e_i$ corresponding to the M-N eigenvalue $\lambda_i$ from the smaller one out of the eigenvector $e_i$ obtained by the eigenvalue decomposition unit 412, and the steering vector $a_{\theta\sim,\varphi}$ which is the transfer function for the direction $(\theta\sim, \varphi)$. The computation of the second spatial spectrum $P''_{\omega,\theta\sim,\varphi,t}$ is performed, for example, by the following equation (16).

[Equation 11]

$$P^n_{\omega,\theta,\phi,t} = \frac{a^H_{\omega,\theta,\phi} \phi^{-1}_{\omega,t} \phi^{-H}_{\omega,t} a_{\omega,\theta,\phi}}{a^H_{\omega,\theta,\phi} \phi^{-1}_{\omega,t} F^n_{\omega,t} F^{nH}_{\omega,t} \phi^{-H}_{\omega,t} a_{\omega,\theta,\phi}} \quad (16)$$

$\theta\sim$ is, with respect to the estimated direction $\hat{\theta}$ of the sound source when the elevation angle is fixed, a limited range $(\hat{\theta}\pm s)$ near the estimated direction $\hat{\theta}$. That is, $\hat{\theta}-s<\theta\sim<\hat{\theta}+s$. That is, the range for estimating the elevation angle is not the range of the entire horizontal angle of 360 degrees, but the limited range near the primarily estimated first horizontal angle $\hat{\theta}$. $\phi$ represents the direction of the elevation angle for calculating the spatial spectrum.

Figure 11:
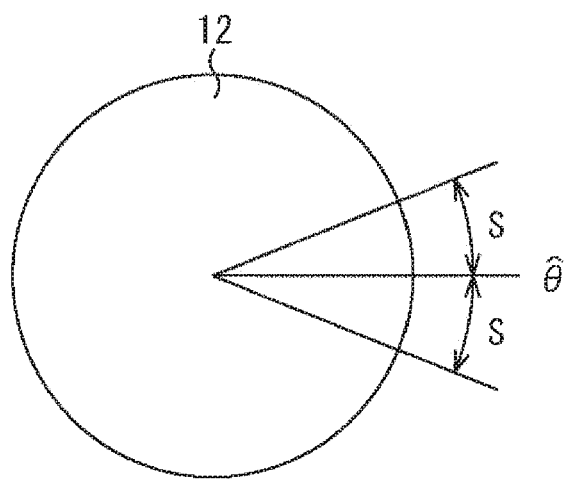
FIG. 11 is a diagram illustrating an estimation range.

FIG. 11 is a diagram illustrating an estimation range. As shown in FIG. 11, the range in which the elevation angle is estimated is not the range of the entire horizontal angle of 360 degrees, but the limited range near the primarily estimated first horizontal angle $(\hat{\theta}\pm s)$. Therefore, the operation amount can be reduced. As a result, even a device whose operation resource is not high (operation capability is not high) can perform the operation in real time. The present technology can be applied to even conditions where the direction in which the user is likely to exist is completely unknown (in a case where there is no information indicating that the user is within the angle of view of the camera and the like or "the user is in this direction" in advance like a wearable device).

The second spatial spectrum is a spatial spectrum representing the degree of sound arrival from the direction $(\theta\sim, \varphi)$. The steering vector $a_{\theta\sim,\varphi}$ for the direction $(\theta\sim, \varphi)$ is stored in advance in the transfer function storage unit 481. The eigenvector $e_i$ is supplied from the eigenvalue decomposition unit 412 of the first MUSIC processing unit 102.

In step S182, the frequency information integration unit 483 computes a weighted average $P''^n_{\theta,\varphi,t}$ of the second spatial spectrum for each frequency by the following equations (17) and (18). The second spatial spectrum $P''_{\omega,\theta\sim,\varphi,t}$ is supplied from the second spatial spectrum computation unit 482. The frequency weight $w_{\omega,t}$ is supplied from the frequency weight computation unit 413 of the first MUSIC processing unit 102.

[Equation 12]

$$\overline{P}^n_{\theta,\phi,t} = \frac{\sum_\omega w_{\omega,t}}{\sum_\omega \frac{w_{\omega,t}}{P^n_{\omega,\theta,\phi,t}}} \quad (17)$$

$$\hat{P}^n_{\theta,\phi,t} = \log \overline{P}^n_{\theta,\phi,t} - \min_{\theta',\phi} \log \overline{P}^n_{\theta',\phi,t} \quad (18)$$

By the above second MUSIC processing of the second MUSIC processing unit 104, the weighted average $P''^n_{\theta\sim,\varphi,t}$ of the second spatial spectrum for each frequency is computed.

Returning to FIG. 7, when the second MUSIC processing of step S104 (processing of FIG. 10) is finished, the second peak detection unit 105 detects the peak in step S105. That is, out of the weighted averaged spatial spectra output by the second MUSIC processing unit 104, the spatial spectrum having the maximum value is detected, and the horizontal angle (second horizontal angle $\theta^{out}$) and the elevation angle $\varphi^{out}$ corresponding to the spatial spectrum are output as the utterance direction $(\theta^{out}, \varphi^{out})$.

As described above, by rotating the movable part 14 and turning the display unit 15 in the estimated utterance direction, it is possible to indicate that a voice from that direction is received.

In this example, since the operation by the MUSIC method is performed, the utterance direction can be accurately determined. Furthermore, the range in which the horizontal angle and the elevation angle are estimated is not the range of the entire horizontal angle of 360 degrees, but the limited range near the primarily estimated first horizontal angle $\hat{\theta}(\hat{\theta}\pm s)$. Therefore, the operation amount can be reduced. As a result, even a device whose operation resource is not high (operation capability is not high) can perform the operation in real time.

Figure 12:
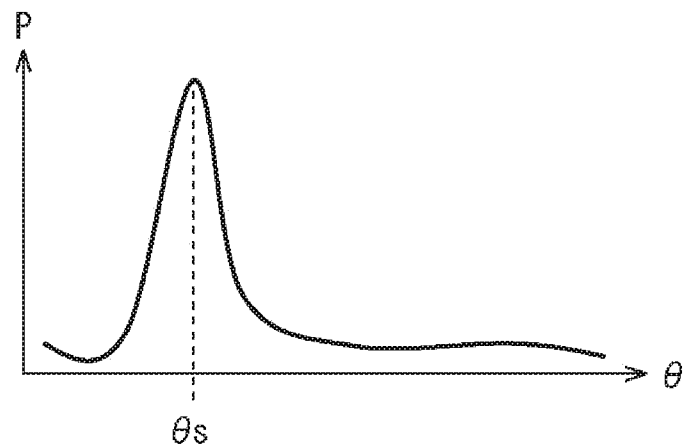
FIG. 12 is a diagram showing a characteristic of a spatial spectrum.
Figure 13:
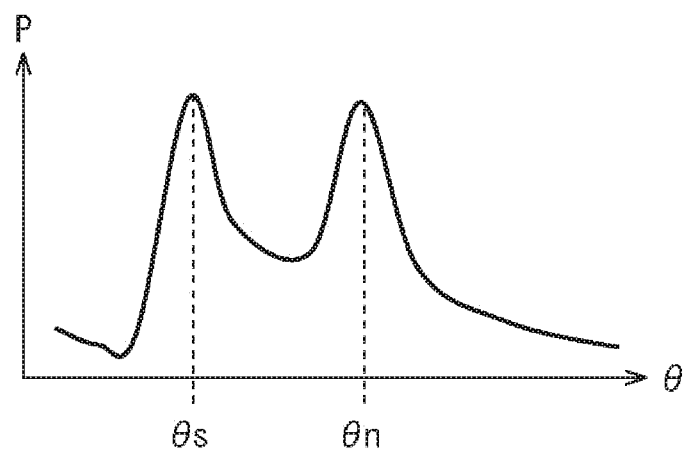
FIG. 13 is a diagram showing the characteristic of the spatial spectrum.
Figure 14:
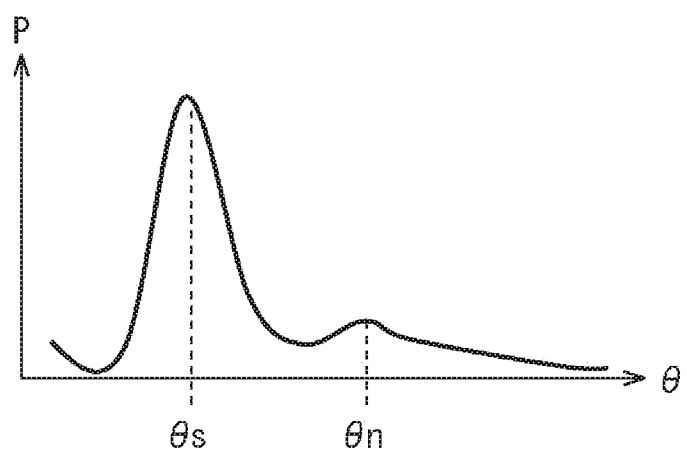
FIG. 14 is a diagram showing the characteristic of the spatial spectrum.

<Characteristics of Spatial Spectrum>
(FIGS. 12 to 14)

Next, characteristics of the spatial spectrum will be described with reference to FIGS. 12 to 14. FIGS. 12 to 14 are diagrams showing the characteristics of the spatial spectrum.

As shown in FIG. 12, the weighted average $P''^n_{\theta\sim,\varphi,t}$ of the second spatial spectrum has a peak in the utterance direction $\theta s$. In an environment with one sound source, this spatial spectrum has a sharp peak at the horizontal angle $\theta i$ of the utterance direction. However, in an environment where noise is constantly generated, for example, as shown in FIG. 13, two or more peaks may appear, not only in the utterance direction es but also in the noise direction $\theta n$. Furthermore, distortion of the spectrum that prevents peaks from being clearly determined occurs.

Therefore, in the voice input device 1, as described with reference to equation (7), the noise is whitened by generalized eigenvalue decomposition. Since this makes it possible to whiten spatially colored noise, when the processing by the MUSIC method is performed using the obtained new eigenvector, as shown in FIG. 14, the peak in the noise direction θn can be suppressed from the spatial spectrum more than in the utterance direction θs.

In a case where the utterance direction estimation unit 71 is configured as shown in FIG. 5, it is not necessary to provide the microphone array 12 in the housing 11 as a fixed part because a device with low operational resources can perform an operation in real time. However, if the microphone array 12 is provided in the housing 11 as a fixed part, it is possible to use a device with lower operational capability in order to estimate the direction of the utterer.

Then, the correlation matrix $K_{\omega, t}$ of the noise signal of the above-described equation (2) can be learned in advance, or can be calculated and held from noise section information having a certain time width while sequentially updating. Even if the movable part 14 rotates, if the arrangement of the microphone array 12, the utterance direction, and the positional relationship in the space do not change before and after the rotation, the spatial information learned until then can be used as it is, performance does not deteriorate due to the operation, and unnecessary confusion does not occur. Then, applications such as call and voice recognition can be used stably.

Disposing the microphone array 12 three-dimensionally is advantageous for accurate estimation of the utterance direction, although the operation amount will increase. However, by attaching the microphone array 12 to the fixed part, as shown in FIGS. 1 to 3, even if a method is employed by which the microphone array 12 is arranged in a plane and the operation amount is smaller, it is possible to accurately estimate the utterance direction. This results in cost reduction.

Sequential learning of the correlation matrix $K_{\omega, t}$ is estimating the characteristics of noise in the usage environment. For example, when a sound such as a television broadcast or a radio broadcast is constantly flowing, noise information in the direction is accumulated in the correlation matrix $K_{\omega, t}$. As a result, when detecting utterance of a person, it is unlikely that the direction of the television or radio is detected by mistake. It takes some time to accumulate enough information in this correlation matrix $K_{\omega, t}$.

If the microphone array 12 is not fixed but rotated, the positional relationship between the microphone array 12 and the space is reset immediately after the rotation. When the direction estimation for detecting the utterance of the user immediately after the rotation (or new user in another direction) is performed, if the correlation matrix $K_{\omega, t}$ that has been learned so far is used, information regarding the direction and intensity of noise from the television or radio broadcast has not yet been learned in the correlation matrix $K_{\omega, t}$. Therefore, immediately after the rotation of the microphone array 12, it becomes difficult to accurately estimate the utterance direction.

However, if the microphone array 12 is fixed, such a problem does not occur because the positional relationship between the microphone array 12 and the space is not reset. In particular, if the movable part 14 is formed symmetrically with respect to the center of rotation like a cylinder, even if reflection by the movable part 14 is considered, the positional relationship between the microphone array 12 and the space does not change before and after the rotation.

Furthermore, a configuration can be considered in which the microphone array 12 is rotated and the rotation angle is calculated from the number of rotation steps of the rotation axis of the servo motor that drives the microphone array 12, and the estimated direction is corrected by the rotation angle. However, if the microphone array 12 is fixed, such correction processing becomes unnecessary.

<Computer>

Figure 15:
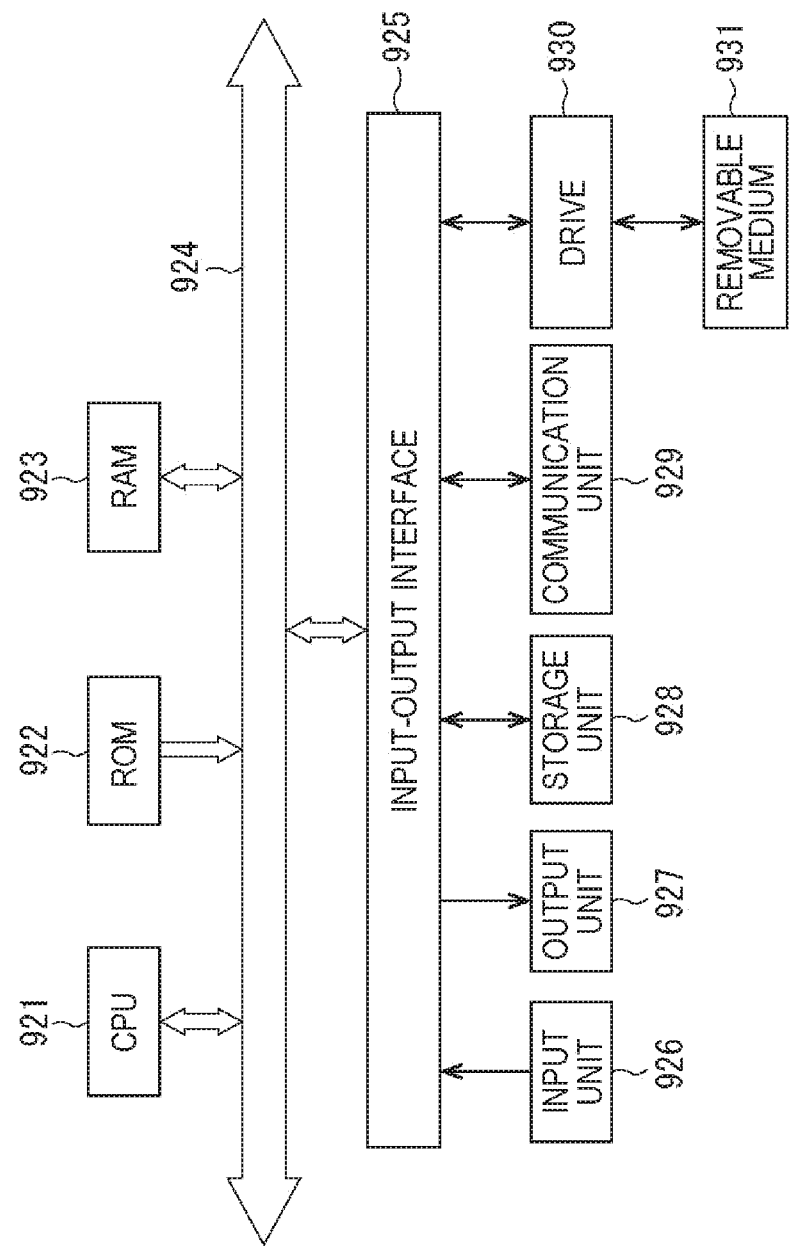
FIG. 15 is a block diagram showing a configuration example of a personal computer.

A series of types of processing described above can be performed by hardware, or can be performed by software. In this case, for example, each device includes a personal computer as shown in FIG. 15. FIG. 15 is a block diagram showing a configuration example of the personal computer.

In FIG. 15, a central processing unit (CPU) 921 performs various types of processing according to a program stored in a read only memory (ROM) 922 or a program loaded from a storage unit 928 to a random access memory (RAM) 923. The RAM 923 also stores data necessary for the CPU 921 to perform various types of processing and the like as needed.

The CPU 921, the ROM 922, and the RAM 923 are connected to one another via a bus 924. An input-output interface 925 is also connected to the bus 924.

An input unit 926 including a keyboard, a mouse, or the like, an output unit 927 including a display such as a CRT or LCD, a speaker, and the like, a storage unit 928 including a hard disk or the like, and a communication unit 929 including a modem, a terminal adapter, or the like are connected to the input-output interface 925. The communication unit 929 performs communication processing via a network, such as, for example, the Internet.

A drive 930 is also connected to the input-output interface 925 as necessary. A removable medium 931 such as a magnetic disk, an optical disk, a magneto-optical disk, or a semiconductor memory is appropriately mounted. A computer program read therefrom is installed in the storage unit 48 as necessary.

Note that in this specification, steps describing the program to be recorded on the recording medium includes not only processing to be executed on a time-series basis according to the listed order, but also processing that may be not necessarily executed on a time-series basis but is executed in parallel or individually.

Furthermore, embodiments of the present technology are not limited to the embodiments described above, and various modifications may be made without departing from the spirit of the present technology.

<Other>

The present technology can also have the following configurations.

(1)

A voice input device including:

a fixed part disposed at a predetermined position;

a movable part movable with respect to the fixed part;

a microphone array attached to the fixed part;

an utterance direction estimation unit configured to estimate an utterance direction on the basis of a voice from an utterer, the voice being input from the microphone array; and a driving unit configured to drive the movable part according to the estimated utterance direction.

(2)

The voice input device according to (1) described above, further including a control unit configured to recognize the voice from the utterer, the voice being input from the microphone array and to control a front driving unit on the basis of a result of the recognition.

(3)

The voice input device according to (1) or (2) described above, in which the control unit includes an internal or external voice recognition engine that recognizes the voice from the utterer.

(4)

The voice input device according to any one of (1) to (3) described above, in which in the microphone array, a plurality of microphones is arranged in a plane.

(5)

The voice input device according to any one of (1) to (4) described above, in which the movable part is symmetric with respect to a rotation center.

(6)

The voice input device according to any one of (1) to (5) described above, in which the utterance direction estimation unit includes:

a first estimation unit configured to estimate a first horizontal angle that is a horizontal angle in the utterance direction from a signal of the voice from the utterer; and a second estimation unit configured to estimate a second horizontal angle that is the horizontal angle in the utterance direction and an elevation angle, with respect to the first horizontal angle, in a predetermined range near the first horizontal angle.

(7)

A voice input method of a voice input device including:

a fixed part disposed at a predetermined position;

a movable part movable with respect to the fixed part; and a microphone array attached to the fixed part, the voice input method including:

a step of estimating an utterance direction on the basis of a voice from an utterer, the voice being input from the microphone array attached to the fixed part; and a step of driving the movable part according to the estimated utterance direction.

(8)

A program for causing a computer to execute voice input processing of a voice input device including:

a fixed part disposed at a predetermined position;

a movable part movable with respect to the fixed part; and a microphone array attached to the fixed part, the voice input processing including:

a step of estimating an utterance direction on the basis of a voice from an utterer, the voice being input from the microphone array attached to the fixed part; and a step of driving the movable part according to the estimated utterance direction.

REFERENCE SIGNS LIST

1 Voice input device
11 Housing
12 Microphone array
13 Microphone
14 Movable part
15 Display unit
16 Speaker
51 Signal processing unit
52 Main control unit
71 Utterance direction estimation unit
72 Signal emphasizing unit
73 Noise suppression unit
74 Echo cancellation unit
81 Voice recognition engine
82 Operation determination unit

The invention claimed is:

1. A voice input device, comprising:

a fixed part configured to be disposed at a determined position;

a movable part movable with respect to the fixed part;

a microphone array attached to the fixed part;

a Central Processing Unit (CPU) configured to:

determine, based on a signal of a voice from an utterer, a first signal having a peak that exceeds a threshold value, wherein the voice is input from the microphone array;

estimate a horizontal angle corresponding to the determined first signal having the peak that exceeds the threshold value as a first horizontal angle in an utterance direction;

calculate a second signal at a horizontal angle and an elevation angle within a range of the first horizontal angle;

detect a peak value of the second signal for the horizontal angle and the elevation angle within the range of the first horizontal angle; and estimate a direction corresponding to the peak value of the second signal as the utterance direction of the voice from the utterer; and a driving unit configured to drive the movable part based on the estimated utterance direction.

2. The voice input device according to claim 1, wherein the CPU is further configured to:

recognize the voice from the utterer, wherein the voice is input from the microphone array; and control a front driving unit based on a result of the recognition of the voice from the utterer.

3. The voice input device according to claim 2, wherein the CPU is further configured to recognize the voice from the utterer based on an internal voice recognition engine or an external voice recognition engine connected to the voice input device.

4. The voice input device according to claim 1, wherein the microphone array includes a plurality of microphones arranged in a plane.

5. The voice input device according to claim 1, wherein the movable part is symmetric with respect to a rotation center.

6. A voice input method of a voice input device, the voice input method comprising:

determining, based on a signal of a voice from an utterer, a first signal having a peak that exceeds a threshold value, wherein the voice is input from a microphone array attached to a fixed part of the voice input device, the fixed part is configured to be disposed at a determined position, and a movable part is movable with respect to the fixed part;

estimating a horizontal angle corresponding to the determined first signal having the peak that exceeds the threshold value as a first horizontal angle in an utterance direction;

calculating a second signal at a horizontal angle and an elevation angle within a range of the first horizontal angle;

detecting a peak value of the second signal for the horizontal angle and the elevation angle within the range of the first horizontal angle;

estimating a direction corresponding to the peak value of the second signal as the utterance direction of the voice from the utterer; and driving the movable part based on the estimated utterance direction.

7. A non-transitory computer-readable medium having stored thereon computer-executable instructions, that when executed by a processor, cause the processor to execute operations, the operations comprising:
- determining, based on a signal of a voice from an utterer, a first signal having a peak that exceeds a threshold value, wherein
- the voice is input from a microphone array attached to a fixed part of a voice input device,
- the fixed part is configured to be disposed at a determined position, and
- a movable part is movable with respect to the fixed part;
- estimating a horizontal angle corresponding to the determined first signal having the peak that exceeds the threshold value as a first horizontal angle in an utterance direction;
- calculating a second signal at a horizontal angle and an elevation angle within a range of the first horizontal angle;
- detecting a peak value of the second signal for the horizontal angle and the elevation angle within the range of the first horizontal angle;
- estimating a direction corresponding to the peak value of the second signal as the utterance direction the voice from the utterer; and
- driving the movable part based on the estimated utterance direction.

* * * * *